Figure 1:
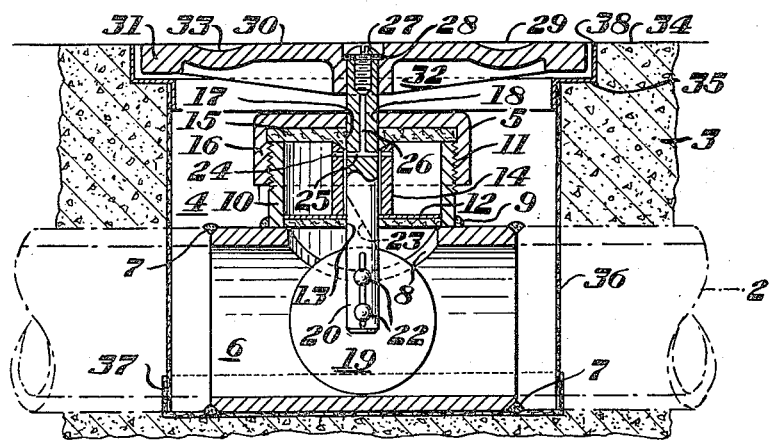

Aug. 26, 1952  D. H. BUTLER  2,608,203

VALVE AND VALVED CONDUIT INSTALLATION

Filed Aug. 1, 1946

INVENTOR
DONALD H. BUTLER
by his attorneys
Stebbins, Blenko
& Webb

Patented Aug. 26, 1952

2,608,203

UNITED STATES PATENT OFFICE 2,608,203

VALVE AND VALVED CONDUIT INSTALLATION

Donald H. Butler, Allison Park, Pa.

Application August 1, 1946, Serial No. 687,778

8 Claims. (Cl. 137—171)

This invention relates to valves and valved conduit installations. It has to do particularly with conduit and valve constructions for use in structures such as floors, walls, etc.

While the invention has other uses it is especially well adapted for use in radiant heating installations. In such installations pipes are disposed within floors, walls and ceilings of structures, heating fluid being passed through the pipes, the heat from the fluid passing by conduction through the pipes and through the floor, wall or ceiling to the surface thereof, whence the heat is radiated into the interior of the structure. It is common to embed pipes for radiant heating in concrete and other monolithic structures. It is desired to provide valves at intervals for controlling the flow of fluid in the pipes while avoiding defacing of the surface of the floor, wall or ceiling by a projecting valve. It is also desirable to provide means for venting the radiant heating system.

I have devised a valve and a conduit installation for use in radiant heating and other systems providing for regulation of the flow of fluid in the system without any unsightly projecting valve, stem or hand wheel and providing for convenient venting of the system through a portion of the valve.

I provide a valve adapted to be disposed in an opening in a structure such as a floor, wall, etc., comprising a valve element and a rotary member for operating the valve element, the rotary member being constructed and arranged to have its outer surface approximately flush with the surface of the structure. I further provide a conduit installation comprising a structure having a conduit therein and an opening extending from the surface of the structure to the conduit, a valve in the conduit and a valve operating member having its outer surface approximately flush with the surface of the structure and largely closing said opening. Desirably the opening is substantially circular at the surface of the structure and the valve operating member is adapted for rotation and of substantially circular shape at its outer surface.

I further provide a valve comprising a butterfly valve element and a stem for operating the valve element, the stem having a vent passage therein for venting air from about the valve element. I still further provide a valve comprising a valve element, a rotatable stem for operating the valve element, the stem having a vent passage therein for venting fluid from about the valve element, and means for closing the vent passage. My valve may comprise a casing together with a valve element in the casing, a stem for operating the valve element, a member surrounding a portion of the stem and a vent passage extending partly within the stem and partly outside the stem and within said member.

Other details, objects and advantages of the invention will become apparent as the following description of a present preferred embodiment thereof proceeds.

Figure 2:
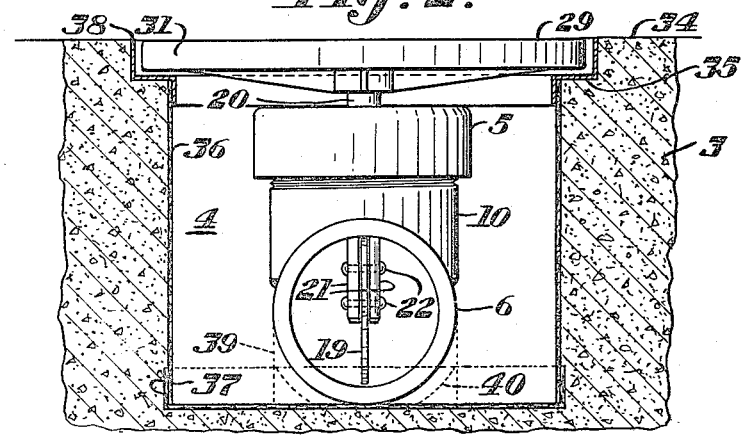
Figure 3:
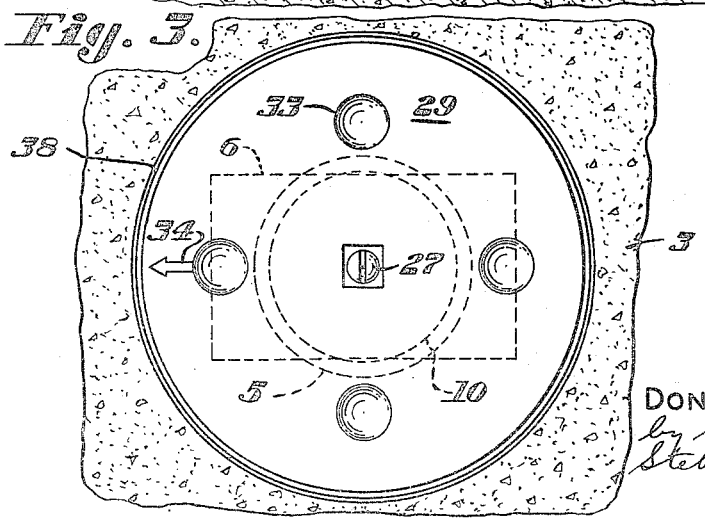

In the accompanying drawings I have shown a present preferred embodiment of the invention, in which Figure 1 is a vertical cross-sectional view through a conduit installation;

Figure 2 is a vertical cross-sectional view through the installation shown in Figure 1 taken at right angles to Figure 1; and Figure 3 is a top plan view of the structure shown in Figures 1 and 2.

Referring now more particularly to the drawings, there is shown a radiant heating installation comprising a conduit or pipe 2 embedded in concrete 3 as in a radiantly heated concrete floor. An opening 4 is provided in the concrete and in that opening is disposed a valve designated generally by reference numeral 5. The valve comprises a cylindrical casing portion 6, preferably a length of pipe adapted to be connected in conduit 2 by welds 7 so that the pipe 2 and the cylindrical portion 6 of the valve casing form in effect a continuous conduit.

The casing portion 6 has an opening 8 at its top, and welded to the casing portion 6 about the opening 8 by a weld 9 is a cylindrical neck 10 whose upper portion is externally threaded at 11. Instead of the welded-on neck, I may use a standard pipe T to provide the portion 6 and neck 10 as an integral structure. The internal diameter of the neck 10 is slightly greater than the diameter of the opening 8. A sealing and guiding member 12 is positioned within the bottom of the neck 10 and so as to rest on the edge defining the opening 8. The member 12 has a central opening 13. Disposed upon the member 12 concentric with the opening 13 is a sleeve 14 whose internal diameter is somewhat greater than the diameter of the opening 13. A positioning and guiding member 15 surmounts the neck 10 and the sleeve 14 and is maintained in position and pressed downwardly upon the neck and sleeve by a screw cap 16 screwed down upon the top of the neck. The member 15 and the cap 16 have central openings 17 and 18, respectively, which are of approximately the same diameter as the opening 13.

Positioned in the casing portion 6 is a butterfly valve element 19 which is adapted to be turned between an ineffective position as shown in the drawings in which the valve element lies generally in a plane containing the axis of the conduit and an effective position in which the valve element lies generally in a plane at right angles to the axis of the conduit. There is provided a valve stem 20, the lower end of which is split providing opposed portions 21 which embrace the valve element. Rivets 22 passing through the portions 21 and the valve element 19 maintain the same assembled. The split in the lower end of the stem 20 extends above the valve element 19, the upper limit of the split being indicated by the dotted line 23 in Figure 1. The split extends up into the sleeve 14. The external diameter of the stem 20 is materially less than the internal diameter of the sleeve 14 to provide a vent passage outside the stem and within the sleeve. Other vent passages are provided through the sleeve and stem. Vent passages 24 are provided through the sleeve 14 and the stem has a crosswise vent passage 25 and an axial vent passage 26 communicating with the passage 25 and terminating at the upper end of the stem. The vent passage 26 is adapted to be closed by a screw 27 which screws into the upper end of the stem. Underlying the screw head is a gasket 28 for sealing the vent passage 26.

Connected with the upper end of the stem 20 is a member 29 in generally the form of a hand wheel but whose upper surface 30 is substantially planar and which is circular, having a relatively heavy rim portion 31 and spaced apart radial strengthening flanges 32 at its under surface. The upper face of the member 29 has four equally spaced depressions 33 which facilitate turning of the member 29. An index 34 may be provided on the member 29 to show the position of the valve relatively to the member 29. The upper surface of the member 29 is substantially flush with the floor surface 34 and the member 29 largely closes the opening 4. It serves substantially as a portion of the floor, there being only a narrow crack around the periphery of the member 29. The under surface of the member 29 is spaced only slightly above a ledge 35 so that if the member 29 is subjected to loads heavy enough to deform it the loads will be transmitted to the concrete at the ledge 35.

To operate the valve element 19 it is merely necessary to turn the member 29 which as above indicated is facilitated by the depressions 33 which may receive, for example, the rubber heel of a shoe or a bar or other pushing member.

The vent passage is normally closed by the screw 27. When the screw is removed, venting of air from the structure occurs through the split portion of the stem 20 which extends up into the sleeve 14, thence through the annular passage outside the stem 20 and within the sleeve 14, thence through the transverse passage 25 in the stem and thence through the axial passage 26 therein. The passages 24 in the sleeve 14 permit venting from the space outside the sleeve 14 and within the neck 10.

I provide a cylindrical enclosure 36 for the valve adapted to serve as a shipping package and also as a shell for forming the opening 4 in the concrete 3 when the latter is poured. The enclosure may be of paper or metal and has a cover 37 on the bottom and a metal reinforcing flange ring 38 around the upper edge. This ring provides a finished edge around the circumference of the opening 4. The side wall of the enclosure may be perforated as at 39 and the cover 37 as at 40, outlining portions which may readily be pushed out to form holes admitting conduit 2. The enclosure may originally be longer than shown and cut to length after removing the ring 38, so that the opening 4 will have the desired depth.

While I have shown and described a present preferred embodiment of the invention it is to be distinctly understood that the invention is not limited thereto but may be otherwise variously embodied within the scope of the following claims.

I claim:

1. A valve comprising a butterfly valve element, a stem having a split portion embracing the butterfly valve element and a member surrounding a portion of the stem, the split portion of the stem entering said member, said member being spaced from the stem to provide a vent passage between said member and the stem, said vent passage communicating with the split portion of the stem whereby to vent fluid from about the butterfly valve element.

2. A valve comprising a butterfly valve element, a stem having a split portion embracing the buterfly valve element and a member surrounding a portion of the stem, the split portion of the stem entering said member, said member being spaced from the stem to provide a vent passage between said member and the stem, said vent passage communicating with the split portion of the stem, the stem having a passage therethrough communicating with said vent passage and leading in the direction away from the butterfly valve element whereby to vent fluid from about the butterfly valve element.

3. A conduit installation comprising a floor structure having a conduit therein and a circular opening extending from the surface of the floor structure to the conduit, a valve housing and a rotary valve member in said housing, a circular valve operating member connected to said valve and having its outer surface approximately flush with the surface of the floor structure and largely closing said opening and a ledge formed in and supported by the floor structure beneath and adjacent to the periphery of said member whereby a force applied to said member on its outer surface will be transmitted to and carried by said ledge.

4. A conduit installation comprising a floor structure having a conduit therein and a circular opening extending from the conduit to a point adjacent to but beneath the surface of the floor structure and thereafter abruptly increasing in diameter to form a ledge, a valve housing, a rotary valve operating member in said housing and connected to said valve and having an outer portion extending above the ledge whereby a force applied to said member on its surface will be transmitted to and carried by said ledge.

5. A conduit control comprising a valve body, a valve in the body, a valve stem for operating the valve, a bonnet closing the body and providing a guide for the stem, a sealing and guiding member within the valve body and between the valve and the bonnet forming with the bonnet a chamber in the body, a vent passage between that portion of the valve body in which the valve is positioned and the chamber, and a passage for venting the chamber to atmosphere.

6. A conduit installation comprising a conduit, an opening in the conduit, a neck on the conduit in line with said opening, a cap on the neck, a valve stem extending axially within the neck and through the cap, a valve on the stem in the conduit, a sealing member within the neck and between the valve and the cap and forming with the cap a chamber in the neck, a passage between the conduit and the chamber for venting air from the conduit and a vent for removing air from the chamber to atmoshpere.

7. A conduit installation comprising a conduit, an opening in the conduit, a neck on the conduit in line with said opening, a valve in the neck and extending through said opening to control the flow of fluid through the conduit, said valve also forming an air chamber in the neck, and means for venting said chamber to atmosphere.

8. A container for a valve adapted to serve as a form in the installation of a valve in a concrete slab, a valve in said container having a valve-stem actuating disc, the upper end wall of said container lying adjacent the lower face of the disc and extending to the bottom of the valve, said container comprising an integral cylinder coaxial with the valve stem and having removable end portions, a metal reinforcing flange ring on the upper edge of the container, the flange ring having a diameter greater than the body of the container so as to surround said disc and extend to the upper surface thereof and form a supporting ledge for the disc when the slab is poured.

DONALD H. BUTLER.

REFERENCES CITED

The following references are of record in the file of this patent:

UNITED STATES PATENTS

| Number | Name | Date |
| --- | --- | --- |
| 955,150 | Gaylord | Apr. 19, 1910 |
| 1,104,560 | Shoobridge | July 21, 1914 |
| 1,108,031 | Tyler | Aug. 18, 1914 |
| 1,229,576 | Boyton | June 12, 1917 |
| 1,325,393 | Calhoun | Dec. 16, 1919 |
| 1,490,039 | Spencer | Apr. 8, 1924 |
| 1,716,277 | Messmer | June 4, 1929 |
| 1,873,273 | Boosey | Apr. 23, 1932 |
| 2,050,640 | Sloan | Sept. 8, 1936 |
| 2,495,584 | Hook | Jan. 24, 1950 |

FOREIGN PATENTS

| Number | Country | Date |
| --- | --- | --- |
| 7,256 | Great Britain | of 1899 |
| 352,330 | Italy | of 1937 |